United States Patent
Herzog

[11] 3,856,950
[45] Dec. 24, 1974

[54] METHOD OF COMBATING INSECTS
[75] Inventor: Alexis Herzog, Basel, Switzerland
[73] Assignee: Ciba-Geigy Corporation, Ardsley, N.Y.
[22] Filed: Feb. 11, 1974
[21] Appl. No.: 441,613

Related U.S. Application Data
[63] Continuation-in-part of Ser. No. 252,784, May 12, 1972, abandoned.

[30] Foreign Application Priority Data
June 1, 1971   Switzerland.......................... 7926/71
Apr. 10, 1972  Switzerland.......................... 5215/72

[52] U.S. Cl. ............................................... 424/226
[51] Int. Cl. .............................................. A01n 9/22
[58] Field of Search .......... 424/226, 249; 260/249.6

[56] References Cited
UNITED STATES PATENTS
3,700,699   10/1972   Singer................................ 424/226

Primary Examiner—Albert T. Meyers
Assistant Examiner—Allen J. Robinson

[57] ABSTRACT

A method of combating insects with compounds of the formula

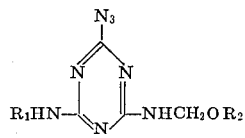

wherein $R_1$ and $R_2$ each represent lower alkyl is disclosed.

6 Claims, No Drawings

METHOD OF COMBATING INSECTS

CROSS-REFERENCE TO RELATED APPLICATIONS

This is a continuation-in-part of my application, Ser. No. 252,784, filed May 12, 1972 now abandoned.

DETAILED DISCLOSURE

The present invention relates to a method of combating insects which comprises the use of s-triazine derivatives of the formula

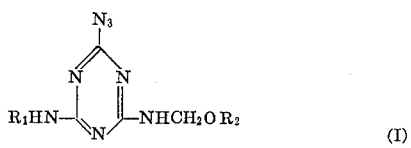

wherein $R_1$ and $R_2$ each represent lower alkyl.

The lower alkyl chains which are possible for $R_1$ and $R_2$ have from one to five carbon atoms and may be branched or straight-chain.

Examples of such radicals include: methyl, ethyl, n-propyl, isopropyl, n-, i-, sec.-, tert.-butyl and n-pentyl.

Particular importance attaches to compounds of the formula

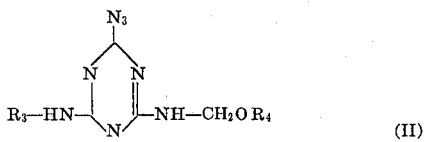

wherein $R_3$ represents methyl, ethyl or isopropyl and $R_4$ represents methyl, ethyl, n-propyl, isopropyl, n- or sec.-butyl.

The following compounds may be cited as examples of compounds of the formula II:

| Compound | M.P. : °C |
|---|---|
| 2-azido-4-(methoxy-methyl-amino)-6-isopropylamino-s-trizine | 120–122 |
| 2-azido-4-(ethoxy-methylamino)-6-isopropylamino-s-trizine | 114–116 |
| 2-azido-4-(n-propoxy-methylamino)-6-isopropylamino-s-trizine | 78–80 |
| 2-azido-4-(isopropoxy-methylamino)-6-isopropylamino-s-triazine | 117–119 |
| 2-azido-4-(methoxy-methylamino)-6-ethylamino-s-triazine | 112–124 |
| 2-azido-4-(ethoxy-methylamino)-6-ethylamino-s-triazine | 123–124 |
| 2-azido-4-(isopropoxy-methylamino)-6-ethylamino-s-triazine | 120–121 |
| 2-azido-4-(sec.-butoxy-methyl-amino)-6-ethylamino-s-triazine | 100–101 |
| 2-azido-4-(sec.-butoxy-methyl-amino)-6-isopropylamino-s-triazine | 68–70 |

The compounds of the formula I are manufactured by reacting a compound of the formula

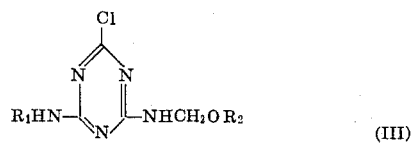

wherein $R_1$ and $R_2$ have the meaning given for the formula I, with an alkali metal azide in the presence of a base, or by reacting the compound of the formula

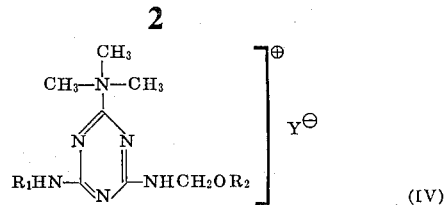

wherein $R_1$ and $R_2$ have the meaning given for the formula I and Y represents an inorganic or organic acid radical, in particular chlorine or bromine, with an alkali metal azide.

Suitable bases are in particular tertiary amines, such as trialkyl amines, also hydroxides, oxides and carbonates of alkali and alkaline earth metals. Water is used preferably as solvent or diluent for the reactions; but it is also possible to use organic solvents which are miscible with water, such as ketones, ethers and ether-like compounds, nitriles, N,N-disubstituted amides, sulphoxides etc., also solvents which are immiscible with water, for example aliphatic and aromatic hydrocarbons and halogenated hydrocarbons.

Analogous compounds are described in Belgian Pat. No. 730 133 as total herbicides and selective herbicides.

Analogous compounds are also described as herbicides in French Pat. No. 1.537.312, and attention is drawn to their possible insecticidal action.

In comparison to these active substances, the compounds of the formula I display a distinct superiority in the fly test.

It is a commonly known fact that phosphoric acid esters, as representatives of classical insecticides, kill both vertebrates and invertebrates by cholinesterase inhibition through the accumulation of acetyl choline at the nerve endings. The accumulated acetyl choline severely disrupts the function of the nervous system and death occurs as a consequence after a few hours. In contrast to the classical insecticides, which, in the form of contact or ingest poisons, kill or paralyse the insects in a few hours, the active substances of the formula I primarily influence the terminal phase of the larval development. Depending on the time of application, the development is arrested in the larval or pupal stage. This mode of action is not comparable with that of classical insecticides, chemosterilants or juvenile hormones.

The active substances of the formula I can be used chiefly for combating the following storage and hygiene pests:

| | |
|---|---|
| Coleoptera | Carabidae |
| | Elateridae |
| | Tenebrionidae |
| | Dermestidae |
| | Cucujidae |
| | Scarabaeidae |
| | Curculionidae |
| Diptera | Culicidae |
| | Simuliidae |
| | Tipulidae |
| | Muscidae |
| | Calliphoridae |

The compounds of the formula I can be used as pure concentrate or together with suitable carriers and/or additives. Suitable carriers and additives can be solid or liquid and correspond to the substances conventionally used in formulation technique such, for example, as solvents, dispersants, wetting agents, adhesives, thickeners, binders and/or fertilizers.

The agents according to the invention are manufactured in known manner by intimately mixing and/or grinding active substances of the formula I with the suitable carriers, optionally with the addition of dispersants or solvents which are inert towards the active substances. The active substances may be available and can be used in the following forms:

Solid forms
    dusts, tracking agents, granules, coated granules, impregnated granules and homogeneous granules, premix (feed additive).
Liquid forms:
    a. active substances which are dispersible in water: wettable powders, pastes, emulsions;
    b. solutions: aerosols.

To manufacture solid forms (dusts, tracking agents), the active substances are mixed with solid carriers. Suitable carriers are, for example: kaolin, talcum, bolus, loess, chalk, limestone, ground limestone, attaclay, dolomite, diatomaceous earth, precipitated silica, alkaline earth silicates, sodium and potassium aluminium silicates (feldspar and mica), secondary calcium phosphate, calcium and magnesium sulphates, magnesium oxide, ground synthetic materials, fertilizers, for example ammonium sulphate, ammonium phosphate, ammonium nitrate, urea, ground vegetable products, such as corn meal, bark dust, sawdust, nutshell meal, cellulose powder, residues of plant extractions, activated charcoal etc. These substances can either be used alone or in admixture with one another.

Granules can be very easily manufactured by dissolving an active substance of the formula I in an organic solvent and applying the resulting solution to a granulated material, for example attapulgite, $SiO_2$, granicalcium, bentonite etc. and then evaporating the solvent.

Polymer granules can also be manufactured by mixing the active substances of the formula I with polymerisable compounds (urea/formaldehyde; dicyandiamide/formaldehyde; melamine/formaldehyde or others), whereupon a mild polymerisation is carried out that does not affect the active substances and in the process of which the granulation is carried out during the gel formation. It is more advantageous to impregnate finished, porous polymer granules (urea/formaldehyde, polyacrylonitrile, polyesters or others) which have a specific surface area and a favourable predeterminable adsorption/desorption ratio, with the active substances, for example in the form of their solutions (in a low boiling solvent) and to remove the solvent. Polymer granules of this kind in the form of microgranules having a bulk density of 300 g/litre to 600 g/litre can also be manufactured with the aid of atomisers. The dusting can be carried out from aircraft.

It is also possible to obtain granules by compacting the carrier with the active substance and carriers and subsequently comminuting the product.

To these mixtures can also be added additives which stabilize the active substance and/or non-ionic, anionic and cationic surface active substances, which for example improve the adhesion of the active ingredients on plants or parts of plants (adhesives and agglutinants) and/or ensure a better wettability (wetting agents) and dispersibility (dispersing agents). The following substances, for example, are suitable: olein/chalk mixture, cellulose derivatives (methyl cellulose, carboxymethyl cellulose), hydroxyethyl glycol ethers of monoalkyl and dialkyl phenols having five to 15 ethylene oxide radicals per molecule and eight to nine carbon atoms in the alkyl radical, lignin sulfonic acids, their alkali metal and alkaline earth metal salts, polyethylene glycol ethers (carbowaxes), fatty alcohol polyethylene glycol ethers having five to 20 ethylene oxide radicals per molecule and eight to 18 carbon atoms in the fatty alcohol moiety, condensation products of ethylene oxide/propylene oxide, polyvinyl pyrrolidones, polyvinyl alcohols, condensation products of urea and formaldehyde, and also latex products.

The water-dispersible concentrates of the active substance, i.e., wettable powders, pastes and emulsifiable concentrates, are agents which can be diluted with water to any concentration desired. They consist of active substance, carrier, optionally additives which stabilize the active substance, surface-active substances and anti-foam agents and, optionally, solvents.

Wettable powders and pastes are obtained by mixing and grinding the active substances with dispersing agents and pulverulent carriers in suitable apparatus until homogeneity is attained. Carriers are, for example, those mentioned for the solid forms of application. In many cases it is advantageous to use mixtures of different carriers. As dispersing agents there can be used, for example, condensation products of sulfonated naphthalene and sulfonated naphthalene derivatives with formaldehyde, condensation products of naphthalene or naphthalene sulfonic acids with phenol and formaldehyde, as well as alkali, ammonium and alkaline earth metal salts of lignin sulfonic acid, in addition, alkylaryl sulfonates, alkali and alkaline earth metal salts of dibutyl naphthalene sulfonic acid, fatty alcohol sulfates such as salts of sulfated hexadecanols, heptadecanols, octadecanols, and salts of sulfated fatty alcohol glycol ethers, the sodium salt of oleoyl ethionate, the sodium salt of oleoyl methyl tauride, ditertiary acetylene glycols, dialkyl dilauryl ammonium chloride and fatty acid alkali and alkaline earth metal salts.

Suitable anti-foam agents are silicones.

The active substances are so mixed, ground, sieved and strained with the additives mentioned above that, in wettable powders, the solid particle size of from 0.02 to 0.04 and in pastes, of 0.03 is not exceeded. To produce emulsifiable concentrates and pastes, dispersing agents such as those given in the previous paragraphs, organic solvents and water are used. Examples of suitable solvents are the following: alcohols, benzene, xylenes, toluene, dimethyl sulfoxide, and mineral oil fractions boiling between 120° and 350° C. The solvents must be practically odourless, not phytotoxic, inert to the active substances and not readily inflammable.

Furthermore, the agents according to the invention can be applied in the form of solutions. For this purpose the active substance or several active substances of general formula I are dissolved in suitable organic solvents, mixtures of solvents or in water. Aliphatic and aromatic hydrocarbons, chlorinated derivatives thereof, alkyl naphthalenes, and mineral oils alone or mixed with each other, can be used as organic solvents.

The content of active substance in the above described agents is between 0.1 to 95%, in which connection it should be mentioned that in the case of application from aircraft or some other suitable means of application, it is possible to use concentrations of up to 99.5% or even pure active substance.

The active substances of the formula I can, for example, be formulated as follows:

Dusts

The following substances are used to manufacture (a) a 5% and (b) a 2% dust:

a) 0.5 parts of active substance
99.5 parts of talcum
b) 2 parts of active substance
1 part of highly disperse silica
97 parts of talcum.

The active substances are mixed with the carriers and ground.

Tracking agent 5 parts of active substance are mixed with
95 parts of carbonate of lime and the mixture is ground to an average particle size of 80μ.

Granules 5 parts of active substance are dissolved in a solvent, e.g. methylene chloride, and the solution is mixed with
2 parts of polyethylene glycol ("Carbowax").
91.5 parts of calcium carbonate are impregnated with the mixture and
1.5 parts of precipitated silica are admixed and the solvent is subsequently evaporated.

Bait granules 2.0 parts of active substance
0.05 parts of colouring matter
1.0 part of celite or China clay are mixed and finely ground. The granules are then mixed with
96.8 parts of crystallised sugar and impregnated with
0.1 part of an adhesive dissolved, for example, in a small amount of isopropanol, and the solvent is evaporated.

Wettable powder 50 parts of active substance
5 parts of a dispersing agent, for example sodium lignin sulphonate,
5 parts of a wetting agent, for example dibutylnaphthalene-sulphonic acid
10 parts of silica and
30 parts of China clay
are mixed and the mixture is finely ground.

Emulsifiable concentrate 20 parts of active substance
20 parts of an emulsifying agent, for example a mixture of alkylarylpolyglycol ether and alkylarylsulphonates, and
60 parts of a solvent, for example xylene, are mixed until the solution is completely homogeneous. This concentrate can be diluted with water to give emulsions of every desired concentration.

Premix (feed additive)

0.25 part of active substance and
4.75 parts of secondary calcium phosphate, or China clay, aerosil or carbonate of lime, are homogeneously mixed with
95.00 parts of a feed, e.g. rabbit feed.

Aerosol

In an aerosol filling plant
0.25 part of active substance
25.00 parts of 1,1,1-trichloroethane and
24.75 parts of benzene are filled into aerosol containers with
50.00 parts of power gas consisting of FREON 11/12 (trichloromono-fluoromethane and dichloromethane, respectively), in the ratio 1:1.

Sprays

The following constituents are used to manufacture (a) a 5% and (b) a 2% spray:

a) 5 parts of active substance
1 part of epichlorohydrin
94 parts of petroleum ether (boiling limits: 160-190°C).
b) 2 parts of active substance
1 part of diazinone
97 parts of kerosene.

The agents herein described can be mixed with other biocidal active substances or agents. In addition to the cited compounds of the formula I, the new agents may contain, for example, insecticides, fungicides, bactericides, fungistatic agents, bacteriostatic agents, in order to broaden the activity spectrum.

The active substances of the formula I are applicable as development retardants for combating insects. In contrast to classical insecticides, which, in the form of contact or ingest poisons, kill or paralyse the insects in a few hours, the active substances of the formula I primarily influence the larval development. The activity consists in a devitalisation of the egg larvae or in preventing adult insects from hatching from pupae. This activity is not comparable with that of classical insecticides, chemosterilants or juvenile hormones.

Since the active substances of the formula I are not harmful to warm-blooded animals, new horizons are opened up for the pricipal field of application: that of combating maggot flies. Instead of — as in the case of insecticides — treating large areas, it is possible to administer the active substances of the formula I to farm animals, for example hens, with the feed. The active substances pass through the alimentary tract unimpaired and are present in the eliminated faeces. The fresh excrement is an ideal breeding ground for hygiene pests, such as flies. The larvae which hatch from the eggs come into immediate contact with the new active substance and their subsequent development is hindered. The larger maggots which migrate from old to fresh excrement likewise come in contact with the active substances and their terminal phase is impaired. The maggots pupate without any noteworthy mortality, but no flies emerge from the pupae.

Besides the selective arrest of development in insects, the application via feed may be highlighted on account of the non-harmful environmental aspect, since only the excrement contains the active substances.

The agents, or the active substances contained therein, unfold their development retardant action primarily therefore on the larval stages of insects, preferably of the order Diptera. They are also applicable for storage protection, in particular for the protection of foodstuffs and supplies in which insect larvae, for example of the order Coleoptera, normally develop.

EXAMPLE 1

Test substances: Active substances of the formula I formulated as solutions in acetone.
Test subject: *Musca domestica*
Concentration: 0.05% of active substance
Test method: 50 g at a time of CSMA maggot substrate are weighed out in beakers. Per active substance (AS), 2 × 2.5 ml of a 1% solution in acetone are pipetted each time on 50 g of substrate. After thoroughly mixing the treated substrate, the solvent is evaporated. Then 2 × 25 one day old Musca domestica maggots are deposited per active substance. The pupae are washed out after 5 days and their hatching rate determined after 10 days. An eventual influence on the metamorphosis is thus ascertained.

| Result Active Substance | n Pupae | n Flies |
|---|---|---|
| 2-azido-4-(methoxy-methyl-amino)-6-isopropylamino-s-triazine | 29 | 0 |
| 2-azido-4-(ethoxy-methylamino)-6-isopropylamino-s-triazine | 0 | 0 |
| 2-azido-4-(n-propoxy-methylamino)-6-isopropylamino-s-triazine | 43 | 0 |
| 2-azido-4-(isopropoxy-methylamino)-6-isopropylamino-s-triazine | 18 | 0 |
| 2-azido-4-(methoxy-methylamino)-6-ethylamino-s-triazine | 34 | 0 |
| 2-azido-4-(ethoxy-methylamino)-6-ethylamino-s-triazine | 24 | 0 |
| 2-azido-4-(isopropoxy-methylamino)-6-ethylamino-s-triazine | 23 | 0 |
| 2-azido-4-(isopropoxy-methylamino)-6-ethylamino-s-triazine | 23 | 0 |
| 2-azido-4-(sec.-butoxy-methylamino)-6-ethylamino-s-triazine | 34 | 0 |
| 2-azido-4-(sec.-butoxy-methylamino)-6-isopropylamino-s-triazine | 50 | 0 |
| Control | 50 | 49 |

EXAMPLE 2

Test compounds.

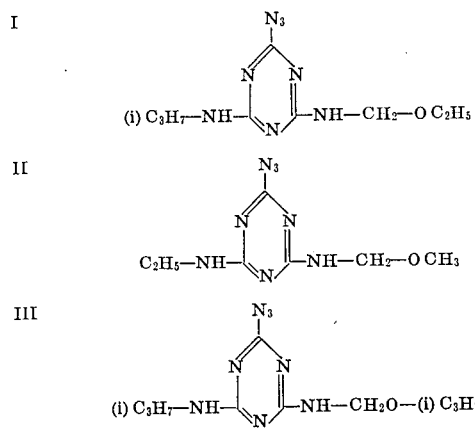

Test method: Contact Action against corn weavil
  Test substances: compounds I to III formulated as 5 % dust
  Test subject: *Sitophilus granarius*
  Concentration: 50 ppm of active substance.
Test method
  1 kg of wheat was thoroughly mixed with the active substance formulated as a dust. 25 corn weavils were then placed on the treated wheat. In 3 months a new generation hatched out the size of which indicated the reduction of population.

| Compound | % Reduction of population in comparison with control |
|---|---|
| I | 85 |
| II | 85 |
| III | 91 |
| Control | 0 |

Conclusion:
Compounds I to III showed a good activity against corn weavil which is member of the order coleoptera.

What I claim is:
1. A method of combatting insects selected from the group consisting of Coleoptera and Diptera which comprises applying to said insects in their larval state a metamorphosis-inhibiting amount of an s-triazine derivative of the formula

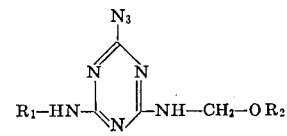

wherein $R_1$ and $R_2$ represent lower alkyl having from one to five carbon atoms.

2. The method of claim 1 wherein the s-triazine derivative is of the formula

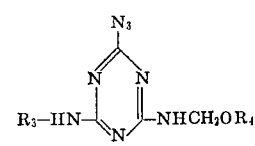

wherein $R_3$ represents methyl, ethyl or isopropyl and $R_4$ represents methyl, ethyl, n-propyl, isopropyl, n-butyl or sec-butyl.

3. The method of claim 2 wherein the s-triazine derivative is of the formula

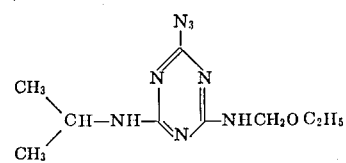

4. The method of claim 2 wherein the s-triazine derivative is of the formula

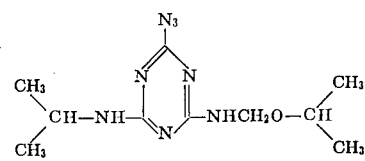

5. The method of claim 2 wherein the s-triazine derivative is of the formula

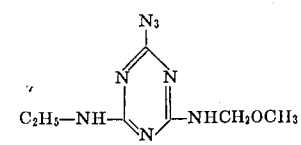

6. The method of claim 2 wherein the s-triazine derivative is of the formula

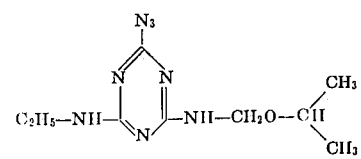

* * * * *